June 25, 1963  J. BLÜMEL  3,094,942
APPARATUS FOR TRANSPORTING PIPE SECTIONS
IN TUNNELS AND LIKE EXCAVATIONS
Filed Aug. 3, 1961  2 Sheets-Sheet 1
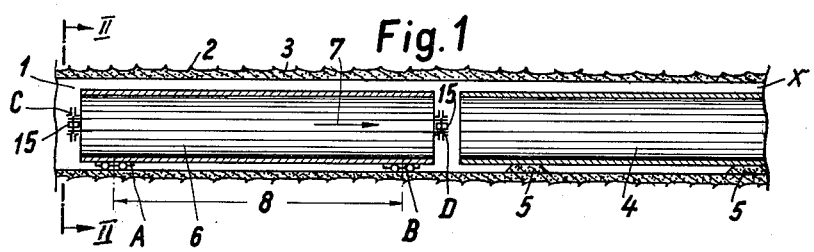
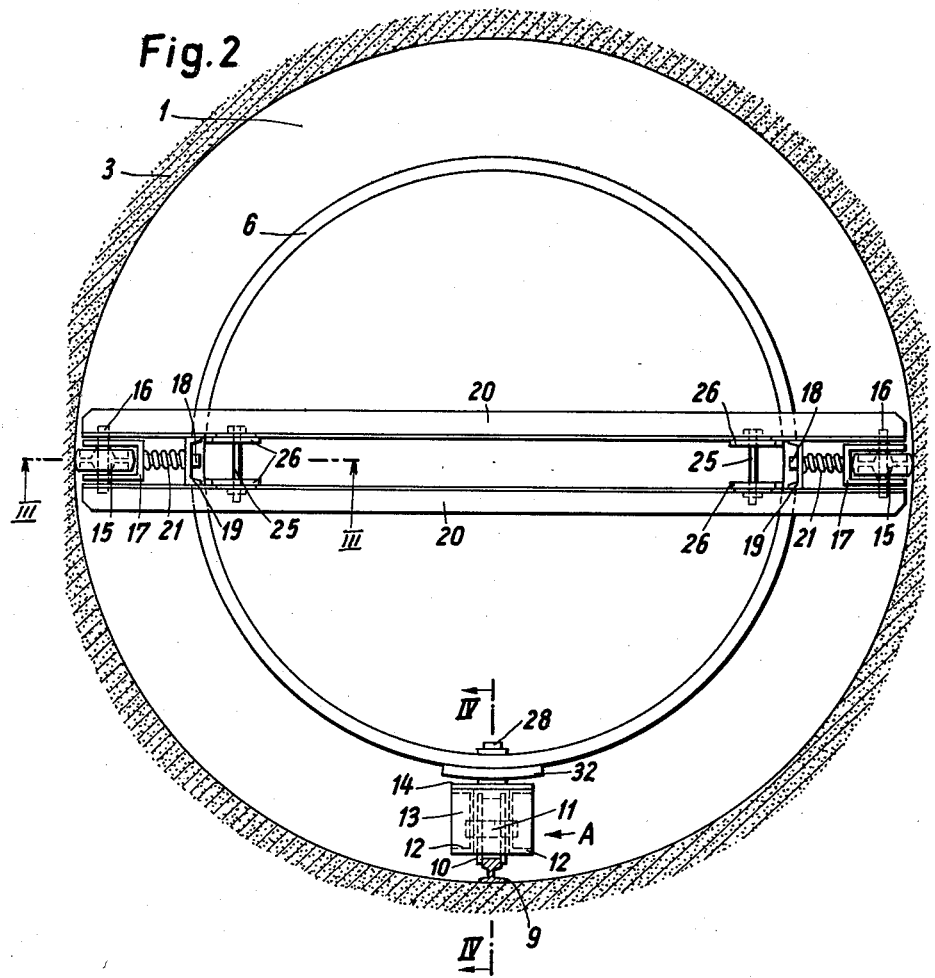
Inventor:
Johannes Blümel
by Michael S. Striker
Attorney June 25, 1963

J. BLÜMEL 3,094,942

APPARATUS FOR TRANSPORTING PIPE SECTIONS
IN TUNNELS AND LIKE EXCAVATIONS

Filed Aug. 3, 1961

Inventor:
Johannes Blümel
by Michael S. Striker
Attorney

United States Patent Office 3,094,942
Patented June 25, 1963

3,094,942
APPARATUS FOR TRANSPORTING PIPE SECTIONS IN TUNNELS AND LIKE EXCAVATIONS
Johannes Blümel, Gelsenkirchen, Germany, assignor to Rheinstahl Union Bruckenbau A.G., Dortmund, Germany
Filed Aug. 3, 1961, Ser. No. 129,052
Claims priority, application Germany Aug. 5, 1960
16 Claims. (Cl. 104—138)

The present invention relates to an apparatus for transporting pipe sections through tunnels and like excavations, and more particularly to an apparatus which is especially suited for the transportation of elongated cylindrical or substantially cylindrical pipe sections through tunnels whose inner surfaces are of cylindrical shape.

It is already known to transport pipe sections on low dollies which are provided with two or more two-wheeled axles. The spacing between the transversely aligned wheels of such dollies is selected with a view to insure that the dollies may properly support a pipe section without tilting. Though a dolly which is provided with two or more two-wheeled axles is satisfactory for the transportation of pipes in tunnels which are formed with horizontal or nearly horizontal bottom surfaces, it is difficult to properly guide such dollies in tunnels of circular cross section in which the wheels do not travel along a horizontal surface. On the other hand, many types of tunnels should be and are of circular cross section, particularly those which are used for the reception of pipe lines serving to convey a liquid, because the cylindrical walls of the pipe line and of the tunnel will more readily withstand the pressure of the conveyed liquid substance. If the wheels of conventional dollies of which I am aware at this time are guided along rails or other guideways, considerable problems are encountered in insuring that the rails are properly spaced from each other whenever the rails are laid in a tunnel of circular cross section because the rails have a tendency to travel transversely along the walls and to move out of alignment with each other.

Accordingly, it is an important object of the present invention to provide an improved transporting apparatus for the sections of pipe lines which is especially suited for the transportation of cylindrical or nearly cylindrical pipes and pipe sections in a tunnel of circular cross section.

Another object of the presetnt invention is to provide a transporting apparatus of the just outlined characteristics which is constructed and assembled in such a way that it can properly guide a pipe section in an upwardly or laterally curving tunnel, and which can properly guide a pipe section even if the cross section of the tunnel varies in the longitudinal direction thereof.

A further object of the invention is to provide a transporting apparatus of the above described type which can be rapidly and conveniently connected with or separated from a pipe section so as to be reusable for the transportation of the next pipe section or sections.

An additional object of my invention is to provide an apparatus for transporting cylindrical or oval pipe sections through tunnels of circular or nearly circular cross section which will automatically center the pipe section in the tunnel so that the pipe section supported on the improved apparatus may be automatically aligned with the preceding section.

Still another object of the instant invention is to provide a transporting apparatus of the above outlined characteristics which comprises a comparatively small number of component parts, which is of rugged construction so that it may be used for the transportation of very long and heavy pipe sections, and which can properly guide a pipe section even if no rails are laid in the interior of the tunnel or if only a single rail is provided therefor.

A concomitant object of the invention is to provide a transporting apparatus of the above outlined characteristics which, in the event that it must be used for the transportation of exceptionally heavy pipe sections, may be reinforced in a very simple way so that it will be capable of taking up the weight of such heavy pipe sections without any damage to its component parts. An additional object of the present invention is to provide a transporting apparatus of the above outlined characteristics which, though intended primarily for the transportation of substantially cylindrical pipe sections through tunnels of circular cross section, is equally useful and is equally practical for the transportation of polygonal pipe sections through tunnels of non-circular cross section, e.g. for the transportation of tubular pipe sections having a rectangular cross section through similarly configurated tunnels or other types of underground excavations.

A further object of the invention is to provide an apparatus of the above described type which is especially suited for the transportation of pipes or pipe sections whose outer diameter closely approaches the inner diameter of the tunnel.

With the above objects in view, the invention resides in the provision of an apparatus for transporting pipes through tunnels and like excavations, particularly through tunnels whose inner surfaces are close to the outer sides of the pipes, which in its simplest form comprises at least one supporting component adapted to be placed beneath the pipe and having wheel means adapted to travel along the inner surface and in the longitudinal direction of the tunnel, and at least one guiding component adapted to be fixed to a longitudinal end of the pipe and comprising a pair of spaced rollers adapted to engage the inner surface of the tunnel intermediate the highest and lowest points thereof at the opposite lateral sides of the pipe.

Certain other features of the invention reside in the provision of specially constructed supporting and guiding components, in the provision of special connections between the various components and the pipe, in the provision of biasing means which insures that the rollers of the guiding components remain in proper rolling engagement with the inner surface of the tunnel, and in the provision of means which enables the pipe to perform movements with respect to the supporting component or components when the pipe is conveyed through an upwardly and/or laterally arching tunnel.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a longitudinal vertical section through a tunnel and through two pipe sections which are introduced into the tunnel, one of the pipe sections being shown in its final position with respect to the tunnel walls and the other pipe section being supported on the transporting apparatus of my invention;

FIG. 2 is a greatly enlarged transverse vertical section through the tunnel as seen in the direction of arrows from the line II—II of FIG. 1, showing one half of the transporting apparatus mounted on the pipe section;

Figure 3:
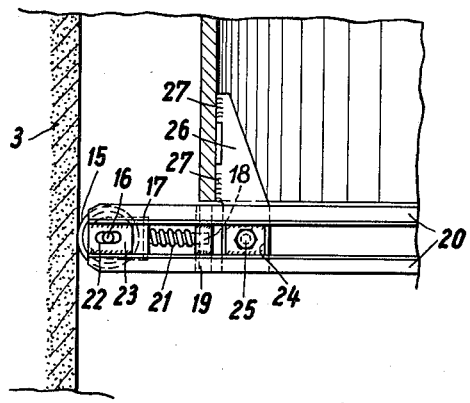
FIG. 3 is a fragmentary horizontal section as seen in the direction of arrows from the line III—III of FIG. 2, showing the mounting of a lateral guide roller for the pipe section.

Referring now in greater detail to the illustrated embodiments, and first to FIG. 1, there is shown an underground excavation 1, hereinafter called tunnel, which is formed by providing a bore in a bed of rock 2 and by lining the inner side of the bore by a tubular layer 3 of concrete. The tunnel 1 is assumed to be used for conveying a liquid, e.g. water, and should receive a large-diameter metallic pipe line consisting of interconnected, end-to-end arranged elongated pipe sections 4, 6, hereinafter called pipes. The adjacent ends of the pipes 4, 6 are welded to each other in a manner which forms no part of the present invention. In addition, the annular space X between the outer side of the pipe line consisting of pipes 4, 6 and the inner surface of the concrete liner 3 is finally filled with concrete or another filler material so as to prevent any displacements of the pipe line with respect to the liner 3.

The right-hand pipe 4 of FIG. 1 rests on a pair of spaced concrete pedestals 5, whereas the left-hand pipe 6 is still mounted on a transporting apparatus which is constructed in accordance with the present invention. It is assumed that the left-hand pipe 6 has been transported in the direction indicated by the arrow 7 and is about to be separated from the transporting apparatus after being placed on two pedestals similar to the pedestals 5.

The transporting apparatus of my invention comprises two preferably identically constructed portions, and each of these portions consists of two components respectively indicated by reference characters A, C and B, D. The portion A, C is located at the rear of trailing end of the left-hand pipe 6, and the portion B, D is located at the forward or leading end of this pipe. In the following description of the invention, only the components A, C will be described in full detail since the construction of the components B, D is identical with the construction of the components A, C, respectively. When the portions A, C and B, D of the transporting apparatus have advanced the left-hand pipe 6 to the position shown in FIG. 1, they are separated from the pipe and are withdrawn in a manner to be fully described hereinafter so that they may be utilized for the introduction of the next pipe. The components A, B support the pipe in that they are located therebelow, whereas the components C, D serve as lateral guide means for the pipe by being respectively mounted at and connected to the trailing and leading ends of the pipe so as to engage the inner surface of the concrete liner 3, preferably substantially midway between the highest and lowest points thereof at the opposite lateral sides of the pipe.

The components C and D will hereinafter be called guiding or centering components, and the components A, B will be called supporting components or dollies. Referring to FIGS. 2 and 3, it will be seen that the guiding component C comprises a main supporting means or frame consisting of four horizontally extending parallel profiled beams 20 which may be of L-shaped section and which extend substantially diametrically and are adjacent to the trailing end of the pipe 6. This frame rotatably supports at its ends a pair of crowned rollers or wheels 15. The rollers 15 engage the inner surface of the liner 3 and, in cooperation with the wheels 10 of the supporting component A, center the pipe 6 in the liner 3 of the tunnel 1 so that the pipe 6 will be in proper end-to-end alignment with the previously introduced pipe 4. The upper and lower pairs of beams 20, as viewed in FIG. 2, are rigidly fixed to each other by U-shaped horizontal connecting elements 19 at points spaced inwardly from the respective ends of the frame.

The vertical shafts 16 of the rollers 15 are rotatably and horizontally movably received in elongated horizontal slots 22 provided in plate-like horizontal connecting elements 23 which are welded or otherwise rigidly fixed to and respectively extend in substantially horizontal planes between the upper and lower pairs of beams 20. The slots 22 extend substantially transversely to the longitudinal direction of the pipe 6. The roller shafts 16 are rotatably mounted in forked bearing members or yokes 17 which are provided with inwardly extending horizontal slide pins 18 reciprocably received in the respective connecting elements 19. Resilient means in the form of helical springs 21 are interposed between the bearing members 17 and the outer sides of the respective connecting elements 19 so as to bias the bearing members and the rollers 15 in directions radially outwardly and into rolling engagement with the inner surface of the concrete liner 3. The extent of radial play of the roller shafts 16 is determined by the length of the slots 22 in the plate-like connecting elements 23.

The means for connecting the beams 20 to each other further comprises horizontal plate-like connectors 24 which are welded or otherwise rigidly secured to the horizontally aligned pairs of beams 20, i.e. the connectors 24 are coplanar or parallel with the connecting elements 23. The adjacent pairs of connectors 24 are formed with aligned vertical bores for bolts 25 which latter serve as a means for coupling the frame consisting of beams 20 with suitable horizontally extending brackets 26, the latter projecting into the interior of the pipe 6 and being welded to the inner side of the pipe by weldants 27. The nature of weldants 27 is preferably such that they may be readily destroyed once the pipe 6 is properly introduced into the liner 3 of the tunnel 1 so that the guiding component C may be conveniently separated from the pipe to be put to renewed use in connection with the transportation of the next pipe. When the pipe 6 is properly located in the tunnel 1 and is supported on the pedestals 5, the coupling bolts 25 are removed from the connectors 24 whereupon the frame consisting of beams 20 may be separated from the pipe. The operator or operators then separate the brackets 26 from the pipe by destroying the weldants 27 in order to reuse these brackets in connection with the transportation of the next pipe.

The provision of yieldably mounted lateral guide rollers 15 is of considerable advantage if the tunnel 1 is not straight, i.e. if it curves in a horizontal plane. In such instances, the rollers 15 will permit the supporting components A, B to advance the pipe 6 along a curve in that the bearing members 17 will either compress or will permit expansion of the springs 21 to the extent determined by the curvature of the tunnel.

The frame including the beams 20 may consist of two halves which are releasably connected with each other so as to facilitate withdrawal of the component C from the tunnel. Of course, it is equally possible to form the component C in such a way that it consists of two independent halves each having a guide roller 15 and each individually secured to a lateral portion and at the respective longitudinal end of the pipe 6. In such instances, the brackets 26 must be non-rotatably secured to the respective half component.

Since the horizontal rollers 15 are subjected to comparatively low stresses when they guide the pipe 6 through the liner 3, they need not travel on rails. Also, since the extent to which one of the rollers 15 moves radially inwardly in a curve equals the extent to which the other roller 15 is free to move radially outwardly, the rollers of the component C may be connected with each other, for example, by utilizing a single slide pin which extends all the way between the right-hand and left-hand bearing members 17 of FIG. 2.

Figure 5:
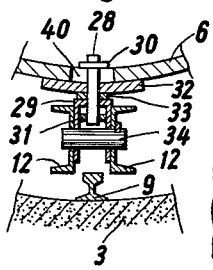
FIG. 5 is a transverse vertical section as seen in the direction of arrows from the line V—V of FIG. 4, showing the frame of the supporting component.
Figure 4:
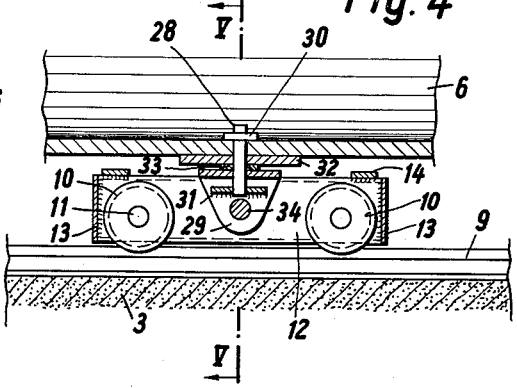
FIG. 4 is a fragmentary vertical section as seen in the direction of arrows from the line IV—IV of FIG. 2, showing the manner in which a supporting component is connected with one end of the pipe section.

FIGS. 2, 4 and 5 show the construction and mounting of the supporting component A. This component comprises a pair of coplanar wheels 10 which are aligned in the longitudinal direction of the pipe 6 and which are adapted to travel in vertical planes along a guide rail 9 which latter is preferably loosely placed onto the inner surface of the concrete liner 3 at the deepest point of the tunnel 1. Since the liner 3 is preferably cylindrical or nearly cylindrical, the rail 9 is automatically maintained in requisite position to guide the pipe 6 and the components A, B toward the pipe 4. In addition, since the lateral guide rollers 15 engage the inner surface of the liner 3 at points substantially midway between the highest and lowest points of the tunnel 1, they also contribute to retention of the rail 9 in requisite position. In other words, the rail 9 is not subjected to appreciable lateral forces which would tend to move it from the position shown in FIG. 2 and, therefore, this rail must take up only the weight of the pipe 6 and of the transporting apparatus connected thereto.

The wheels 10 are provided with annular flanges which extend downwardly along the lateral faces of the rail 9 to prevent derailment of the supporting component A. The horizontal axles 11 of the wheels 10 are mounted in the spaced parallel vertical bases or webs of two substantially U-shaped bearing plates 12 whose longitudinal ends are rigidly connected to each other in spaced relation by vertical connecting members 13 and whose upper flanges are rigidly connected with connecting members 14 so that the parts 12, 13, 14 form a rigid, preferably welded, frame for the horizontal wheel axles 11.

The coupling means between the pipe 6 and the supporting component or dolly A preferably comprises a single vertically extending pivot member 28 which passes through a transversely extending elongated slot 40 formed in the bottom zone of the pipe 6 adjacent to the trailing end thereof. An annular flange 30 is secured to the upper portion of the pivot member 28 and abuts against the inner surface of the pipe 6. The lower portion of the pivot member 28 extends through the top wall of a forked bearing member or yoke 29 whose side walls are pivotally mounted on a transversely extending horizontal journal 34 secured to and extending between the webs of the bearing plates 12 substantially midway between the front and rear wheels 10. The side walls of the bearing member 29 are reinforced by an apertured horizontal plate 31 through which the pivot member 28 extends. The pipe 6 rests on the upper side of an arcuate carrier plate 32 which is traversed by the pivot member 28 and whose curvature preferably equals or approaches the curvature of the outer side of the pipe. The plate 32 rests on a friction reducing washer 33 surrounding the pivot member 28 above the top wall of the bearing member 29. The washer 33 insures that the wheels 10 are not subjected to excessive stresses when they travel on a curved portion of the rail 9. In other words, the pipe 6 and the carrier plate 32 may turn about the pivot member 28 with respect to the supporting component A when the pipe is advanced in a curved portion of the tunnel 1. Such turning movements of the pipe 6 and of the carrier plate 32 are also facilitated by the provision of the aforementioned transverse slot 40 which is shown in FIG. 5. The horizontal journal 34 permits pivotal movements of the frame 12-14 thereabout when the supporting component A travels along humps or other projections and/or depressions of the rail 9. In addition, the journal 34 insures that the weight of the pipe 6 and of the guiding components C, D is uniformly distributed to all wheels 10 of the supporting components. Still further, the frame 12-14 of the component A will pivot about the journal 34 when the tunnel 1 is inclined upwardly or downwardly with respect to a horizontal plane.

Once the pipe 6 is moved to the position of FIG. 1, it is supported by wooden beams or the like, not shown, and the supporting components A, B are thereupon withdrawn rearwardly along the rail 9 by means of suitable cables, chains or other flexible elements which are preferably fixed to the supporting components prior to introduction of the pipe 6 into the tunnel 1. The wooden beams are removed after the formation of concrete pedestals 5. All that is necessary to disconnect the components A, B from the pipe 6 is to withdraw the pivot members 28 in an upward direction. In the next step, the slots 40 are sealed, as by welding, and the leading end of the pipe 6 is welded or otherwise sealingly connected with the trailing end of the pipe 4. In the final step, the space X is filled with concrete to permanently retain the pipe 6 in the liner 3.

It is often sufficient to provide flanges on only one of the wheels 10 forming part of a supporting component. For example, if the leading wheel 10 (i.e. the right-hand wheel, as seen in FIG. 4) is flanged, the trailing wheel will automatically remain in proper engagement with the rail 9.

Figure 6:
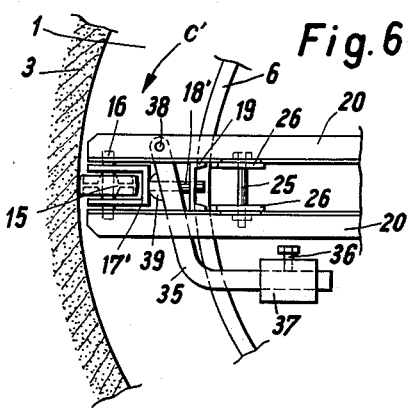
FIG. 6 is a fragmentary end view of a pipe section and of a differently mounted lateral guide roller.

Referring to FIG. 6, there is shown a portion of a modified guiding component C' which is identical with the component C or D excepting that the resilient means 21 of FIG. 3 are replaced by weighted levers 35 whose purpose is to yieldably retain and to bias the rollers 15 in rolling engagement with the inner surface of the concrete liner 3. The advantage of the construction shown in FIG. 6 is that the guiding component C' can be separated from the pipe 6 with less effort because the operator or operators need not overcome the bias of comparatively strong springs but merely lift the levers 35 to the extent necessary to permit the roller shafts 16 to move with the rollers 15 away from firm engagement with the liner 3. As shown, the upper end of the substantially L-shaped biasing lever 35 for the left-hand lateral guide roller 15 is pivotable about a horizontal pin 38 which is mounted in the upper pair of beams 20 inwardly of the modified bearing member 17'. The latter need not be provided with a slide pin such as the pin 18 of FIG. 2 or 3 because its base is engaged by a suitable preferably semispherical motion-transmitting projection 39 provided at the outer end of a slide pin 18' connected to an intermediate portion of the lever 35 and slidably received in a bore of the horizontal connecting element 19. The lower end portion of the lever 35 assumes the form of a substantially horizontal arm which carries a longitudinally adjustable weight 37 adapted to be releasably secured thereto by a screw bolt 36 so as to vary the bias of the lever upon the bearing member 17'. The weight 37 may be conveniently separated from the lever 35 so that only the weight of the lever must be overcome when the operator desires to move the roller 15 away from engagement with the inner surface of the liner 3. Also, the weight 37 may be replaced by a heavier or lighter weight, if necessary. Otherwise, the construction of the component C' is the same as that of the components C and D.

The transporting apparatus of my invention is of particular advantage when it is necessary to introduce pipes into circular tunnels, e.g. into tunnels for pipe lines serving to convey water or other liquids. Circular tunnels are preferred for such purposes because the cylindrical tunnel walls will more readily withstand the liquid pressure and the distribution of liquid pressure is more uniform. Since the supporting components A, B are comparatively flat, i.e. their vertical dimensions are rather negligible, and since the guiding components C, D must extend only slightly beyond the lateral sides of the pipe, the outer diameter of the pipe may be only slightly less than the inner diameter of the liner 3 so that relatively small quantities of material are necessary to fill the space X between the liner and the pipe line.

Of course, it will be readily understood that the transporting apparatus of my invention may comprise three or more supporting components if the weight of the pipe is such that two supporting components would be insufficient to properly support the same. In such instances, the pipe is formed with three or more transversely extending slots 40 so that each thereof may accommodate a pivot member 28.

Figure 7:
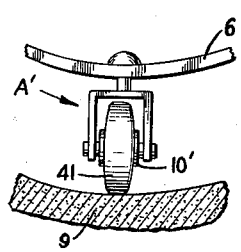
FIG. 7 is a fragmentary elevational view of a pipe section and of a modified supporting component therefor.

The lateral guide rollers 15 may assume the form of pneumatic wheels of rubber like material such as are used on automotive vehicles, or the form of full tires, i.e. tires without tubes. As shown in FIG. 7, it is also possible to replace the supporting components A, B by modified components A' whose wheels 10' are provided with inflated or full tires 41 of rubber like material adapted to travel directly along and in engagement with the inner surface of the liner 3 so that the rail 9 may be dispensed with.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. An apparatus for transporting pipes through tunnels and like excavations whose inner surfaces are close to the outer sides of the pipes, said apparatus comprising, in combination, at least one supporting component adapted to be placed beneath the pipe and having wheel means adapted to travel along the inner surface and in the longitudinal direction of the tunnel; and at least one guiding component comprising means adapted to be detachably fixed to a longitudinal end of the pipe and comprising a pair of spaced rollers adapted to engage the inner surface of the tunnel intermediate the highest and lowest points thereof at the opposite lateral sides of the pipe.

2. An apparatus for transporting substantially cylindrical pipes through substantially horizontal tunnels and like excavations of substantially circular cross section whose inner surfaces are close to the outer sides of the pipes, said apparatus comprising, in combination, at least two spaced supporting components comprising means adapted to be detachably fixed beneath the pipe and each having wheel means adapted to travel along the inner surface and in the longitudinal direction of the tunnel; and a pair of guiding components, each adapted to be fixed to one longitudinal end of the pipe and each comprising a pair of spaced rollers adapted to engage the inner surface of the tunnel intermediate the highest and the lowest points thereof at the opposite lateral sides of the pipe.

3. An apparatus for transporting pipes through tunnels and like excavations whose inner surfaces are close to the outer sides of the pipes, said apparatus comprising, in combination, at least one supporting component comprising means adapted to be detachably fixed beneath the pipe and having wheel means of rubber like material adapted to travel along and to engage the inner surface so as to be movable in the longitudinal direction of the tunnel; and at least one guiding component comprising means adapted to be detachably fixed to a longitudinal end of the pipe and comprising a pair of spaced rollers adapted to engage the inner surface of the tunnel intermediate the highest and lowest points thereof at the opposite lateral sides of the pipe.

4. An apparatus for transporting pipes through tunnels and like excavations whose inner surfaces are close to the outer sides of the pipes, said apparatus comprising, in combination, at least one supporting component comprising means adapted to be detachably fixed beneath the pipe and having wheel means adapted to travel along the inner surface and in the longitudinal direction of the tunnel; and at least one guiding component comprising means adapted to be detachably fixed to a longitudinal end of the pipe and comprising a pair of spaced tires adapted to engage and to roll along the inner surface of the tunnel intermediate the highest and lowest points thereof at the opposite lateral sides of the pipe.

5. An apparatus for transporting elongated pipes through tunnels and like excavations whose inner surfaces are close to the outer sides of the pipes, said apparatus comprising, in combination, at least two spaced supporting components adapted to be placed beneath the pipe, each of said components comprising a frame, means for releasably coupling the frame to the pipe, and wheel means having substantially horizontal axles mounted in the respective frame so that the wheel means may roll along the inner surface of the tunnel in the longitudinal direction thereof, the wheel means of said components being substantially coplanar with each other; and a guiding component at each longitudinal end of the pipe, each of said guiding components comprising frame means, means for releasably coupling the frame means to the respective end of the pipe, and a pair of guide rollers having substantially vertical shafts mounted in the respective frame means, said rollers adapted to engage the inner surface of the tunnel intermediate the highest and lowest points thereof at the opposite lateral sides of the pipe.

6. An apparatus for transporting elongated pipes through tunnels and like excavations whose inner surfaces are close to the outer sides of the pipes, said apparatus comprising, in combination, at least two spaced supporting components adapted to be placed beneath the pipe, each of said components comprising a frame, means for releasably coupling the frame to the pipe, and wheel means having substantially horizontal axles mounted in the respective frame so that the wheel means may roll along the inner surface of the tunnel in the longitudinal direction thereof, the wheel means of said components being substantially coplanar with each other; and a guiding component at each longitudinal end of the pipe, each of said guiding components comprising frame means, means for releasably coupling the frame means to the respective end of the pipe, and a pair of guide rollers having substantially vertical shafts mounted in the respective frame means, said rollers adapted to engage the inner surface of the tunnel substantially midway between the highest and lowest points thereof at the opposite lateral sides of the pipe.

7. An apparatus for transporting elongated pipes through tunnels and like excavations whose inner surfaces are close to the outer sides of the pipes, said apparatus comprising, in combination, a guide rail received in and extending in the longitudinal direction of the tunnel at the lowermost point of the inner surface thereof; at least two spaced supporting components adapted to be placed beneath the pipe, each of said components comprising a frame, means for releasably coupling the frame to the pipe, and wheel means having substantially horizontal axles mounted in the respective frame so that the wheel means may roll along said rail in the longitudinal direction thereof, the wheel means of said components being substantially coplanar with each other; and a guiding component at each longitudinal end of the pipe, each of said guiding components comprising frame means, means for releasably coupling the frame means to the respective end of the pipe, and a pair of guide rollers having substantially vertical shafts mounted in the respective frame means, said rollers adapted to engage the inner surface of the tunnel intermediate the highest and lowest points thereof at the opposite lateral sides of the pipe.

8. An apparatus for transporting elongated pipes through tunnels and like excavations whose inner surfaces are close to the outer sides of the pipes, said apparatus comprising, in combination, a guide rail received in and extending in the longitudinal direction of the tunnel at the lowermost point of the inner surface thereof; at least two spaced supporting components adapted to be placed beneath the pipe, each of said components comprising a frame, means for releasably coupling the frame to the pipe, and a plurality of wheel means having substantially horizontal axles mounted in the respective frame so that the wheel means may roll along said rail in the longitudinal direction thereof, the wheel means of said components being substantially coplanar with each other and at least one wheel means of each supporting component having flanges engaging the lateral sides of the rail so as to prevent derailment of the respective component; and a guiding component at each longitudinal end of the pipe, each of said guiding components comprising frame means, means for releasably coupling the frame means to the respective end of the pipe, and a pair of guide rollers having substantially vertical shafts mounted in the respective frame means, said rollers adapted to engage the inner surface of the tunnel intermediate the highest and lowest points thereof at the opposite lateral sides of the pipe.

9. An apparatus for transporting elongated pipes through tunnels and like excavations whose inner surfaces are close to the outer sides of the pipes, said apparatus comprising, in combination, at least two spaced supporting components adapted to be placed beneath the pipe, each of said components comprising a frame, means for releasably coupling the frame to the pipe, and wheel means having substantially horizontal axles mounted in the respective frame so that the wheel means may roll along the inner surface of the tunnel in the longitudinal direction thereof, the wheel means of said components being substantially coplanar with each other; and a guiding component at each longitudinal end of the pipe, each of said guiding components comprising frame means, means for releasably coupling the frame means to the respective end of the pipe, bearing means reciprocably mounted in the respective frame means so as to be movable substantially transversely of the pipe, and a pair of guide rollers having substantially vertical shafts mounted in said bearing means, said rollers adapted to engage the inner surface of the tunnel intermediate the highest and lowest points thereof at the opposite lateral sides of the pipe.

10. An apparatus as set forth in claim 9, further comprising means for biasing said rollers into engagement with the inner surface of the tunnel.

11. An apparatus for transporting pipes through tunnels and like excavations whose inner surfaces are close to the outer sides of the pipes, said apparatus comprising, in combination, at least two spaced supporting components adapted to be placed beneath the pipe, each of said components comprising a frame, a substantially vertical pivot member for pivotally and releasably coupling the frame to the pipe, and wheel means having substantially horizontal axles mounted in the frame so that the wheel means may roll along the inner surface of the tunnel in the longitudinal direction thereof, the wheel means of said components being substantially coplanar with each other; and a guiding component at each longitudinal end of the pipe, each of said guiding components comprising frame means, means for releasably coupling the frame means to the respective end of the pipe, and a pair of guide rollers having substantially vertical shafts mounted in said frame means, said rollers adapted to engage the inner surface of the tunnel intermediate the highest and lowest points thereof at the opposite lateral sides of the pipe.

12. An apparatus for transporting pipes through tunnels and like excavations whose inner surfaces are close to the outer sides of the pipes, said apparatus comprising, in combination, at least two spaced supporting components adapted to be placed beneath the pipe, each of said components comprising a frame, a substantially vertical pivot member insertable through transversely extending slot means formed in the pipe for pivotally and releasably coupling the frame to the pipe, and wheel means having substantially horizontal axles mounted in the frame so that the wheel means may roll along the inner surface of the tunnel in the longitudinal direction thereof, the wheel means of said components being substantially coplanar with each other; and a guiding component at each longitudinal end of the pipe, each of said guiding components comprising frame means, means for releasably coupling the frame means to the respective end of the pipe, and a pair of guide rollers having substantially vertical hsafts mounted in said frame means, said rollers adapted to engage the inner surface of the tunnel intermediate the highest and lowest points thereof at the opposite lateral sides of the pipe.

13. An apparatus for transporting pipes through tunnels and like excavations whose inner surfaces are close to the outer sides of the pipes, said apparatus comprising, in combination, at least two spaced supporting components adapted to be placed beneath the pipe, each of said components comprising a frame, a substantially vertical pivot member insertable through transversely extending slot means formed in the pipe for pivotally and releasably coupling the frame to the pipe, friction reducing means mounted on said pivot member intermediate said frame and the pipe, and wheel means having substantially horizontal axles mounted in the frame so that the wheel means may roll along the inner surface of the tunnel in the longitudinal direction thereof, the wheel means of said components being substantially coplanar with each other; and a guiding component at each longitudinal end of the pipe, each of said guiding components comprising frame means, means for releasably coupling the frame means to the respective end of the pipe, and a pair of guide rollers having substantially vertical shafts mounted in said frame means, said rollers adapted to engage the inner surface of the tunnel intermediate the highest and lowest points thereof at the opposite lateral sides of the pipe.

14. An apparatus for transporting pipes through tunnels and like excavations whose inner surfaces are close to the outer sides of the pipes, said apparatus comprising, in combination, at least two spaced supporting components adapted to be placed beneath the pipe, each of said components comprising a frame, a bearing member, a journal extending transversely to the longitudinal direction of the pipe for pivotally connecting said frame to said bearing member, a substantially vertical pivot member turnably received in said bearing member for releasably connecting the latter to the pipe whereby the frame is pivotable about said pivot member and about said journal, and a pair of spaced wheels having substantially horizontal axles mounted in the frame at the opposite sides of said pivot member so that the wheels may travel along the inner surface of the tunnel in the longitudinal direction thereof, the wheels of said components being substantially coplanar with each other; and a guiding component at each longitudinal end of the pipe, each of said guiding components comprising frame means, means for releasably coupling the frame means to the respective end of the pipe, and a pair of guide rollers having substantially vertical shafts mounted in said frame means, said rollers adapted to engage the inner surface of the tunnel intermediate the highest and lowest points thereof at the opposite lateral sides of the pipe.

15. An apparatus for transporting pipes through tunnels and like excavations whose inner surfaces are close to the outer sides of the pipes, said apparatus comprising, in combination, at least one supporting component adapted to be placed beneath the pipe and having wheel means adapted to travel along the inner surface and in the longitudinal direction of the tunnel; and at least one guiding component adapted to be fixed to a longitudinal end of the pipe and comprising a frame, means for releasably fixing said frames to the pipe, a pair of bearing members reciprocably mounted in said frame so as to be movable radially inwardly and outwardly with respect to the pipe, a roller mounted in each of said bearing members, and resilient means for biasing said bearing members radially outwardly so as to maintain the rollers in rolling engagement with the inner surface of the tunnel intermediate the highest and lowest points thereof at the opposite lateral sides of the pipe.

16. An apparatus for transporting pipes through tunnels and like excavations whose inner surfaces are close to the outer sides of the pipes, said apparatus comprising, in combination, at least one supporting component adapted to be placed beneath the pipe and having wheel means adapted to travel along the inner surface and in the longitudinal direction of the tunnel; and at least one guiding component adapted to be fixed to a longitudinal end of the pipe and comprising a frame, means for releasably fixing said frame to the pipe, a pair of bearing members reciprocably mounted in said frame so as to be movable radially inwardly and outwardly with respect to the pipe, a roller mounted in each of said bearing members, and weighted lever means pivotally connected with said frame and engaging with said bearing members for biasing the same radially outwardly so as to maintain the rollers in rolling engagement with the inner surface of the tunnel intermediate the highest and lowest points thereof at the opposite lateral sides of the pipe.

References Cited in the file of this patent

UNITED STATES PATENTS

| 1,061,214 | Batcheller | May 6, 1913 |
| 2,296,771 | Crawford et al. | Sept. 22, 1942 |

FOREIGN PATENTS

| 761,011 | Great Britain | Aug. 11, 1954 |